United States Patent [19]

Murakami et al.

[11] Patent Number: 5,519,671
[45] Date of Patent: May 21, 1996

[54] ELECTRONIC EQUIPMENT WITH DEPTH MEASURING FUNCTION

[75] Inventors: Tomomi Murakami, Tokyo; Tatsuo Nitta, Kawagoe; Hiroyuki Kihara, Kodaira; Kazuya Mitaki, Tachikawa, all of Japan

[73] Assignee: Citizen Watch Co., Ltd., Japan

[21] Appl. No.: 351,434

[22] PCT Filed: Mar. 11, 1994

[86] PCT No.: PCT/JP94/00394

§ 371 Date: Dec. 15, 1994

§ 102(e) Date: Dec. 15, 1994

[87] PCT Pub. No.: WO94/20886

PCT Pub. Date: Sep. 15, 1994

[30] Foreign Application Priority Data

Mar. 12, 1993 [JP] Japan .................. 5-077447
Sep. 10, 1993 [JP] Japan .................. 5-248481

[51] Int. Cl.⁶ .................. G09B 47/06; G01L 9/00
[52] U.S. Cl. .................. 368/10; 368/11; 73/384; 73/753
[58] Field of Search .................. 368/10, 11, 14; 73/290, 291, 300, 384–387, 753–754; 364/556, 558, 561

[56] References Cited

U.S. PATENT DOCUMENTS

| | | | |
|---|---|---|---|
| 4,783,772 | 11/1988 | Umemoto | 368/11 |
| 4,835,716 | 5/1989 | Tamaki | 364/558 |
| 5,031,160 | 7/1991 | Koizumi | 368/10 |
| 5,148,376 | 9/1992 | Sato | 364/558 |

FOREIGN PATENT DOCUMENTS

| | | |
|---|---|---|
| 55-80010 | 6/1980 | Japan . |
| 59-18415 | 1/1984 | Japan . |
| 60-183896 | 12/1985 | Japan . |
| 61-130890 | 6/1986 | Japan . |
| 61-231479 | 10/1986 | Japan . |
| 62-71889 | 4/1987 | Japan . |
| 62-110184 | 5/1987 | Japan . |
| 62-162916 | 7/1987 | Japan . |
| 62-203090 | 9/1987 | Japan . |
| 63-88789 | 6/1988 | Japan . |
| 3-8794 | 10/1991 | Japan . |

*Primary Examiner*—Vit W. Miska
*Attorney, Agent, or Firm*—Howell & Haferkamp

[57] ABSTRACT

A water detecting means 5 and an operation designating means for operating a depth measuring function means 6 are arranged. When the water detecting means 5 detects water, the depth measuring function means 6 is forcibly operated by the operation designating means. When a depth state representing a value smaller than a predetermined depth value continues for a predetermined period of time, although the water detecting means detects water, a wet alarm is displayed, and the operation of the depth measuring function means is terminated. Also in a non-diving mode, a 0-m depth reference pressure is measured and stored at predetermined time intervals.

19 Claims, 12 Drawing Sheets

ELECTRONIC EQUIPMENT WITH DEPTH MEASURING FUNCTION

TECHNICAL FIELD

The present invention relates to an electronic equipment with a depth measuring function and at least a timepiece function and, more particularly, to such an electronic equipment having a water detecting means for detecting if the electronic equipment is wet with water or salt water.

BACKGROUND ART

Diving in marine sports is very popular among young people, and various electronic wristwatches having depth measuring functions, i.e., so-called diver's watches have been developed accordingly.

An electronic wristwatch with a depth measuring function of this type is exemplified by the following electronic wristwatch (e.g., Japanese Utility Model Laid-Open Nos. 60-183895 and 60-183896). In this wristwatch, to minimize the power consumption by operating a depth measuring circuit during only actual diving because the depth measuring circuit has a very high current consumption, a power switch and a main switch such as a mode selection switch are arranged independently of a water detecting means. When the main switch is set in an ON state and the water detecting means is set in an ON state upon detecting that the wristwatch has become wet with water or salt water. A transparent electrode formed on the surface of the cover glass of the electronic wristwatch is used as the water detecting means. The water detecting means detects a change in conduction resistance or capacitance when water or salt water comes in contact with this electrode.

An automatic sounding thermometer described in Japanese Patent Laid-Open No. 55-80010 comprises an underwater operation switch serving as a water detecting means for detecting a water pressure or the electrical resistance of salt water, a power switch, and a start switch. When the start switch is turned on upon a turn-ON operation of the power switch, the underwater operation switch is started by the water pressure or salt water, thereby driving the depth measuring circuit.

Generally, a beginner becomes nervous before diving, and his/her mind is too much occupied with diving. For this reason, even if the diver has the above-described electronic wristwatch with the depth measuring function, he/she often forgets to turn on the main switch before diving. As a result, depth measurement cannot be performed at all, or it is too late to turn on the switch during diving.

To prevent the failure of depth measurement due to forgetting of a turn-ON operation of the switch, a specialized depth measurement device was proposed in Japanese Patent Laid-Open No. 59-18415 in which only a water detecting means for detecting if the wristwatch is wet with water is arranged while omitting a main switch. When this water detecting means detects water, depth measurement is started. However, this prior art disclosed in Japanese Patent Laid-Open No. 59-18415 is not a device incorporated in an electronic wristwatch but a specialized depth measurement device having a simple structure. All circuits are normally set in an inoperative state. All the circuits including a display driving circuit are set in an operative state in accordance with a signal from the water detecting means, thereby performing depth measurement.

Since a diver wears such a specialized depth measurement device on a wrist immediately before diving, no problem is posed. However, as for a wristwatch with such a depth measuring function, the wristwatch is worn on the wrist also during non-diving, so it may get wet with rain or at the time of face washing. In this case, the water detecting means detects water to start a depth measuring operation, and at the same time, display is switched from time display to depth display. This causes instantaneous confusion, or an operation for returning the display to the original time display need to be performed.

On the other hand, in a general electronic equipment with a depth measuring function, the main switch is operated to measure and store a 0-m depth reference pressure before diving depth measurement. After diving is started, a diving depth is calculated from a relative pressure value with respect to the 0-m reference pressure value by the water detecting means.

The device disclosed in Japanese Patent Laid-Open No. 59-18415 comprises no main switch. For this reason, the first output value (pressure value) obtained when the water detecting means detects that the device comes underwater is used as a 0-m depth reference pressure value.

However, the depth at the start of diving may instantaneously reach 1 m or more, and in some cases, several m although it differs depending on diving styles. Therefore, in the above method of measuring the reference value, a pressure value to be actually measured corresponds to a reference value not at a depth of 0 m but at a depth of 1 to several m. For this reason, in subsequent depth calculation using this pressure value as a 0-m depth reference pressure value, a depth error corresponding to 1 to several m is generated.

In addition, in the electronic equipment with the depth measuring function of this type, after a current starts to flow through a pressure sensor in accordance with a signal from the water detecting means, a predetermined period of time is required until the circuit is stabilized, and A/D conversion and calculation of the depth value is completed. When this delay of time is taken into consideration, the depth measurement error caused due to the above 0-m depth reference pressure error increases further.

All of the electronic equipments with the depth measuring function disclosed in Japanese Utility Model Laid-Open Nos. 60-183895 and 60-183896, the automatic sounding thermometer disclosed in Japanese Patent Laid-Open No. 55-80010, and the device having only the water detecting means in Japanese Patent Laid-Open No. 59-18415 have the following problem after diving. That is, if water or salt water remains on the water detecting means, or salt, dust, or dirt adheres to the water detecting means after diving, the water detecting means determines that the device is underwater on the basis of a change in conduction resistance or capacitance, and the depth measuring circuit continues to operate. As a result, an unexpected increase in current consumption causes run down of a battery.

The present invention has been made in consideration of the above situations, and has as its first object to provide an electronic equipment with a depth measuring function in which a program for display switching from normal display such as a time to depth measurement display by a water detecting means is provided, thereby improving convenience.

The present invention has as its second object to provide an electronic equipment with a depth measuring function, which performs measurement of the 0-m depth reference pressure as accurately as possible, thereby minimizing a depth measurement error.

The present invention has as its third object to provide an electronic equipment with a depth measuring function, which minimizes the battery consumption after diving.

DISCLOSURE OF INVENTION

In an electronic equipment with a depth measuring function having depth measuring means, at least timepiece function means, display means commonly used for display of each function means, and mode selecting means for mode-selecting each function means, the present invention is characterized by comprising water detecting means and operation designating means for forcibly operating the depth measuring function means when the water detecting means detects water.

The present invention is also characterized in that the depth measuring function means comprises a depth measuring circuit for measuring a depth, a reference value storing circuit for storing a reference pressure value at a depth of 0 m, and a measurement control circuit for intermittently operating the depth measuring circuit, the measurement control circuit intermittently operating the depth measuring circuit in a mode other than a depth measuring function operation mode in accordance with a mode signal from the mode selecting means to store the detected reference pressure value in the reference value storing circuit.

The present invention is also characterized in that the depth measuring function means comprises depth determining means and continuous time determining means, a diving end signal is output when it is detected by the depth determining means and the continuous time determining means that a depth state representing a value smaller than a predetermined depth value has continued for a predetermined period of time, and the operation designating means is controlled to cancel the depth measuring function operation mode.

The present invention is also characterized in that the depth measuring function means comprises a wet alarm display portion and wet alarm signal display means, and the wet alarm signal display means displays a wet alarm on the basis of the diving end signal.

BEST MODE OF CARRYING OUT THE INVENTION

For a more detailed description, the present invention will be described with reference to the accompanying drawings. The same reference numbers denote the same constituent elements throughout the drawings.

An electronic wristwatch with a depth measuring function to be exemplified below is a digital electronic wristwatch.

Figure 6:
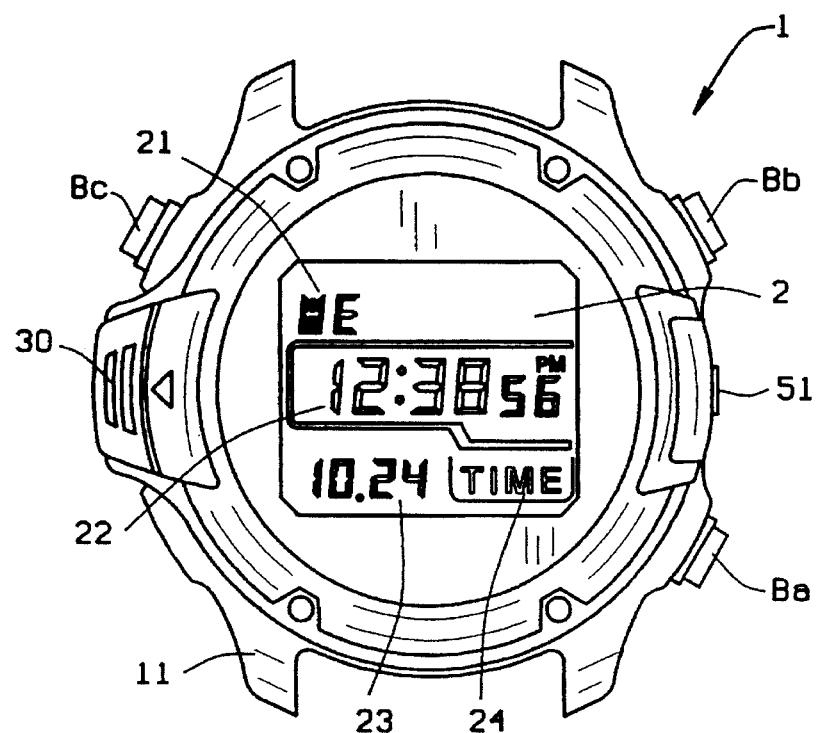
FIG. 6 is a view showing a time display form in a timepiece mode of the electronic wristwatch with the depth measuring function according to the present invention.

Referring to FIG. 6, reference numeral 1 denotes an electronic wristwatch with a depth measuring function as a whole, and reference numeral 2 denotes a display means. In this embodiment, the display means 2 displays 10.24 as calendar information, WE (Wednesday) as a day of the week, and 12:38:56 PM (afternoon) as a time. Reference symbols Ba, Bb, and Bc denote operating buttons used for time correction and the like. Reference numeral 30 denotes a pressure sensor mounted in an outer case 11 of the wristwatch 1, which is constituted by, e.g., a semiconductor pressure sensor. The pressure sensor 30 is mounted to be partially exposed to the side surface of the outer case 11 and detects the atmospheric pressure and the water pressure using a conventional technique.

Figure 5:
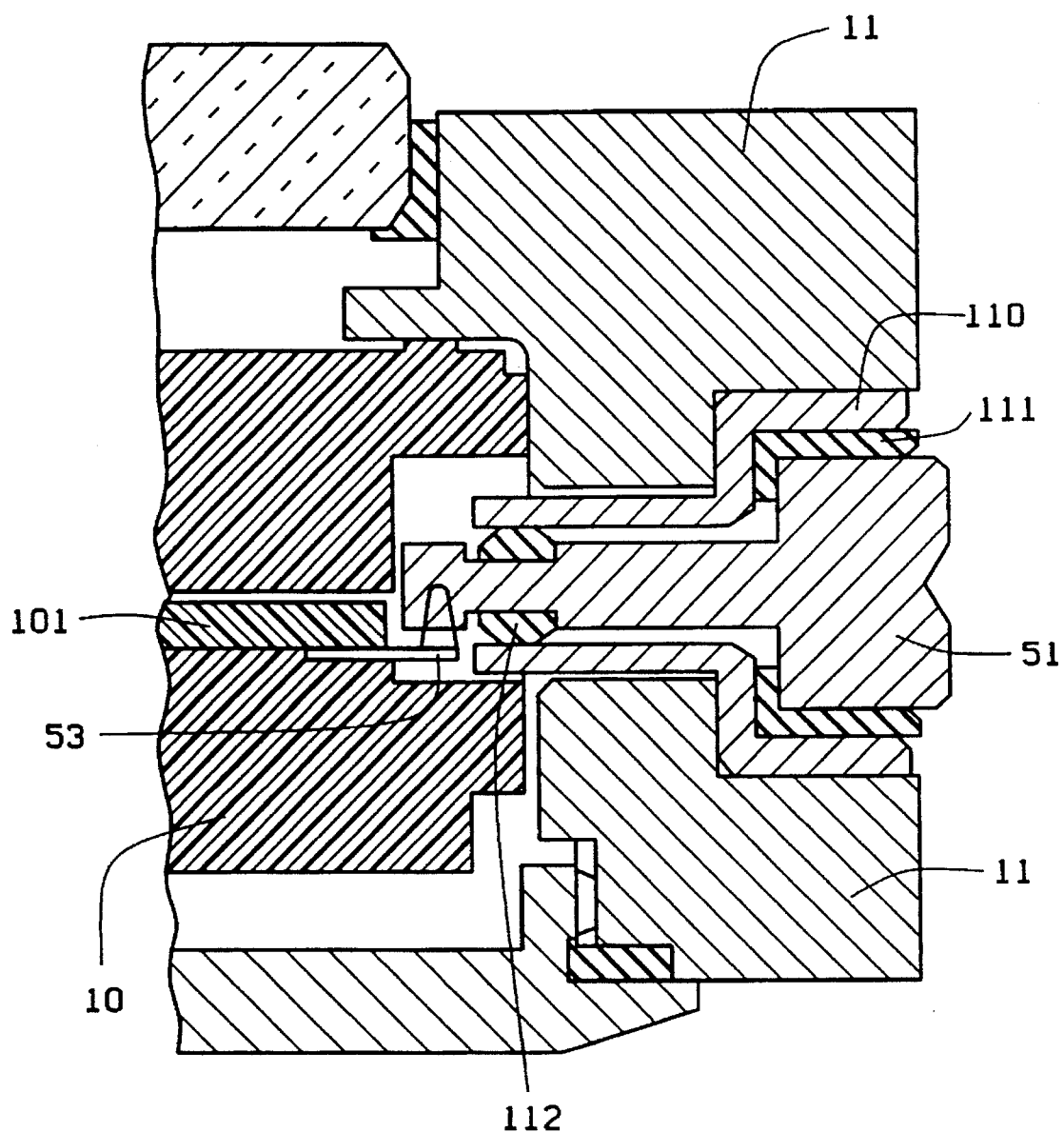
FIG. 5 is a sectional view of the water detecting means of the electronic wristwatch with the depth measuring function according to the present invention.

FIG. 5 is an enlarged sectional view of a water detecting means of the electronic wristwatch according to the present invention.

Referring to FIG. 5, reference numeral 51 denotes a water detecting terminal which uses packings 111 and 112 so as to be electrically insulated from the outer case 11 connected to a voltage level VDD. The water detecting terminal 51 is mounted in a side pipe 110 in the side surface of the outer case 11, and is normally pulled down to a voltage level VSS through a pull-down resistor 52, as shown in FIG. 2. Reference numeral 53 denotes a contact spring electrically connected to a circuit board 101 of a module 10 of the electronic wristwatch 1. When the contact spring 53 is pressed against the water detecting terminal 51, the water detecting terminal is electrically connected to a water detecting circuit 54 on the circuit board 101. A water detecting means 5 in FIG. 1 is constituted by the water detecting terminal 51, the pull-down resistor 52, the water detecting circuit 54, and the outer case 11.

Figure 1:
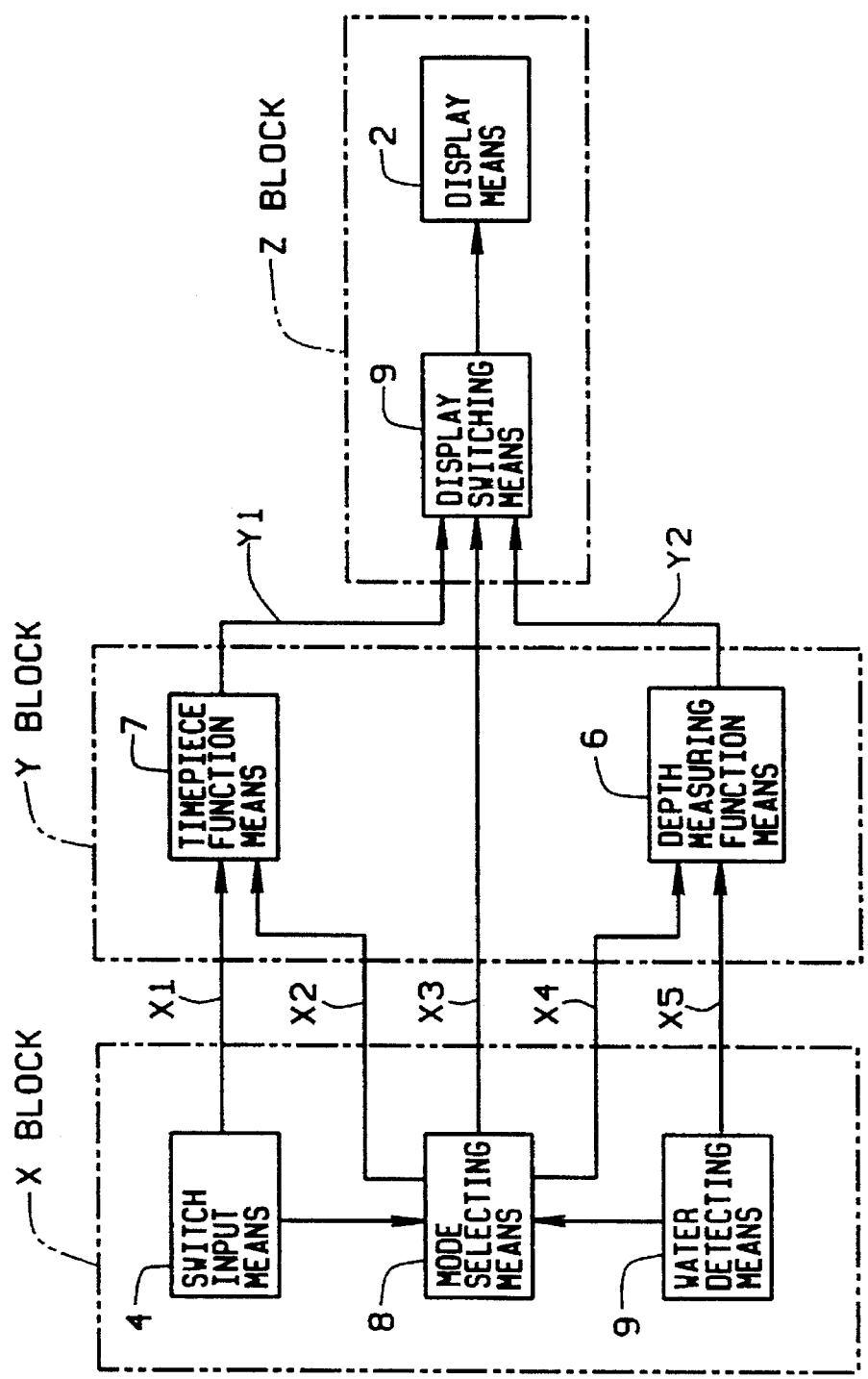
FIG. 1 is a block diagram showing the entire structure of an embodiment of an electronic wristwatch with a depth measuring function as one example of an electronic equipment with a depth measuring function according to the present invention.
Figure 2:
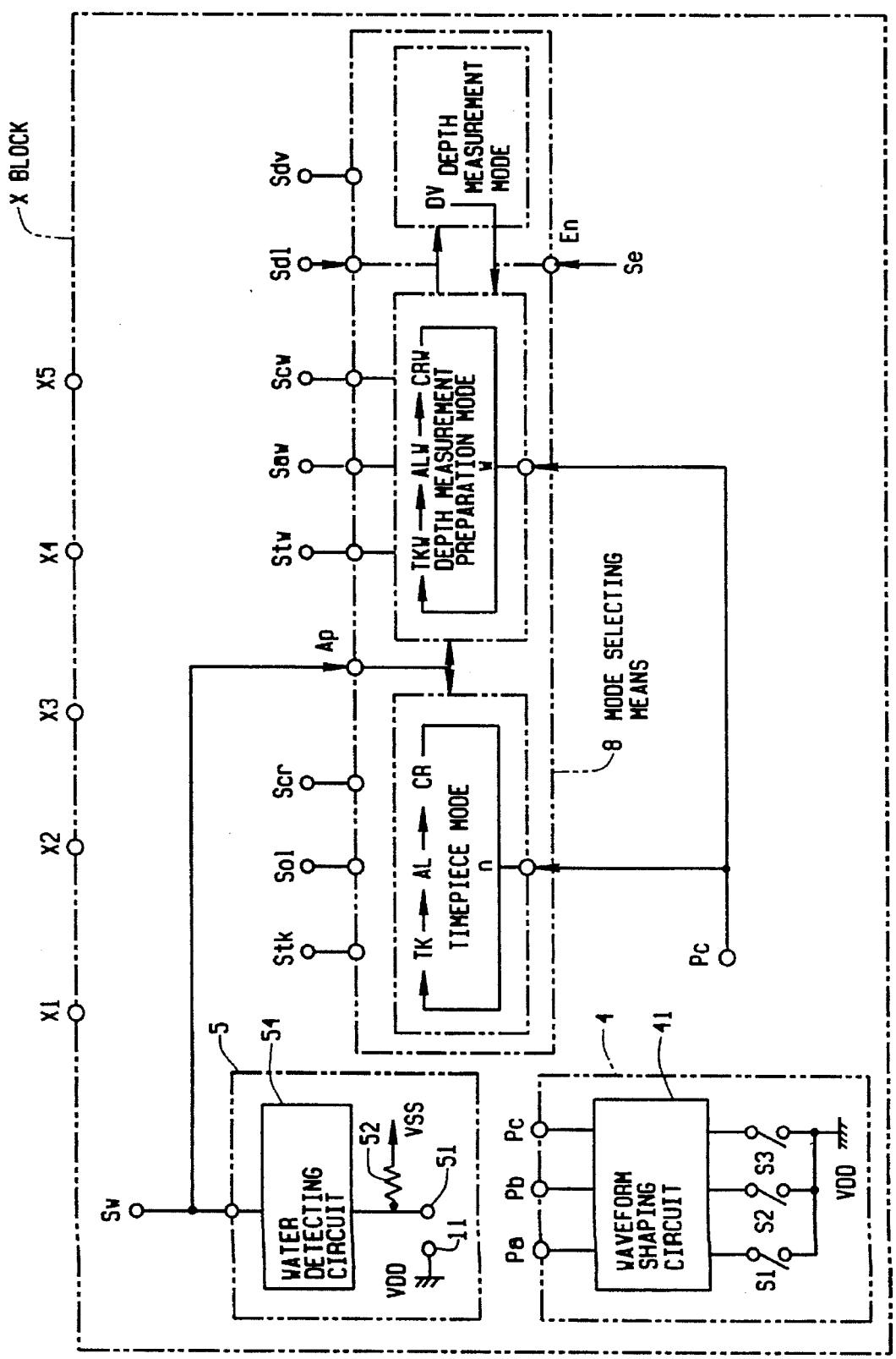
FIG. 2 is a detailed block diagram of a block X including a switch input means, a water detecting means, and a mode selecting means shown in FIG. 1.

FIG. 1 is a block diagram showing the structure of an embodiment of the electronic wristwatch with the depth measuring function according to the present invention.

The electronic wristwatch is constituted by a block X including a switch input means 4, the water detecting means 5, and a mode selecting means 8; a block Y including a timepiece function means 7 and a depth measuring function means 6; and a block Z including a display switching means 9 and the display means 2. In this embodiment, the timepiece function means 7 having time, alarm, and chronograph function means is exemplified. The display switching means 9 switches between an output signal from the depth measuring function means 6 and an output signal from the timepiece function means 7 in accordance with an output signal from the mode selecting means 8, and displays the content of either signal on the display means 2. The switch input means 4 is operated by the operating buttons Ba, Bb, and Bc shown in FIG. 6. The mode selecting means 8 and the timepiece function means 7 are controlled in a manner interlocked with the operations of the buttons Ba, Bb, and Bc.

FIG. 2 is a detailed block diagram of the block X in FIG. 1, which includes the switch input means 4, the water detecting means 5, and the mode selecting means 8.

Reference numeral 41 denotes a waveform shaping circuit for converting operating signals for switches S1, S2, and S3 respectively operated by the operating buttons Ba, Bb, and Bc shown in FIG. 6 into pulse signals Pa, Pb, and Pc. The waveform shaping circuit 41 controls the mode selecting means 8 in accordance with the operating signal Pc for the switch S3. The mode selecting means 8 has two selection loops, i.e., a loop n corresponding to a timepiece mode and a loop w corresponding to a depth measurement preparation mode. In the timepiece mode, upon operation of the operating button Bc for a short period of time, the first loop n circulating through a time mode terminal TK, an alarm mode terminal AL, and a chronograph mode terminal CR is operated, and these terminals output mode selection signals Stk, Sal, and Scr, respectively.

A forced designation terminal Ap of the mode selecting means 8 controlled in accordance with an output signal Sw from the water detecting means 5 constitutes an operation designating means. In the timepiece mode, when the output signal Sw from the water detecting means 5 goes to VDD level, i.e., logical "H" level (to be abbreviated as H level hereinafter) and input to the forced designation terminal Ap, the state of the second loop w, i.e., the depth measurement preparation mode for forcibly operating the depth measuring function means 6 is set. In this mode, upon operation of the operating button Bc for a short period of time, the second loop w circulating through a time mode terminal TKW, an alarm mode terminal ALW, and a chronograph mode terminal CRW is operated, and these terminals output mode selection signals Stw, Saw, and Scw, respectively.

In this depth measurement preparation mode, when the output signal Sw from the water detecting means 5 goes to VSS level, i.e., logical "L" level (to be abbreviated as L level hereinafter) and input to the forced designation terminal Ap, the operation of the depth measuring function means 6 is terminated, and the state of the first loop n, i.e., the timepiece mode is set.

In the state of the second loop w, i.e., the depth measurement preparation mode, when a depth signal Sd1 representing a depth state having a value larger than a predetermined depth value goes to H level, the second loop w shifts to the depth measuring mode, and a depth measuring mode selection signal Sdv is output from a depth measuring terminal DV.

Reference symbol En denotes a diving completion terminal for receiving a signal (to be referred to as a diving end signal hereinafter) Se representing that a depth state having a value smaller than a predetermined depth value has continued for a predetermined period of time. In the depth measuring mode, when the diving end signal Se goes to H level, i.e., it is detected that a predetermined period of time has elapsed after a depth state with a larger value shifts to that with a smaller value, the depth measuring mode shifts to the depth measurement preparation mode (the state of the second loop w).

Figure 3:
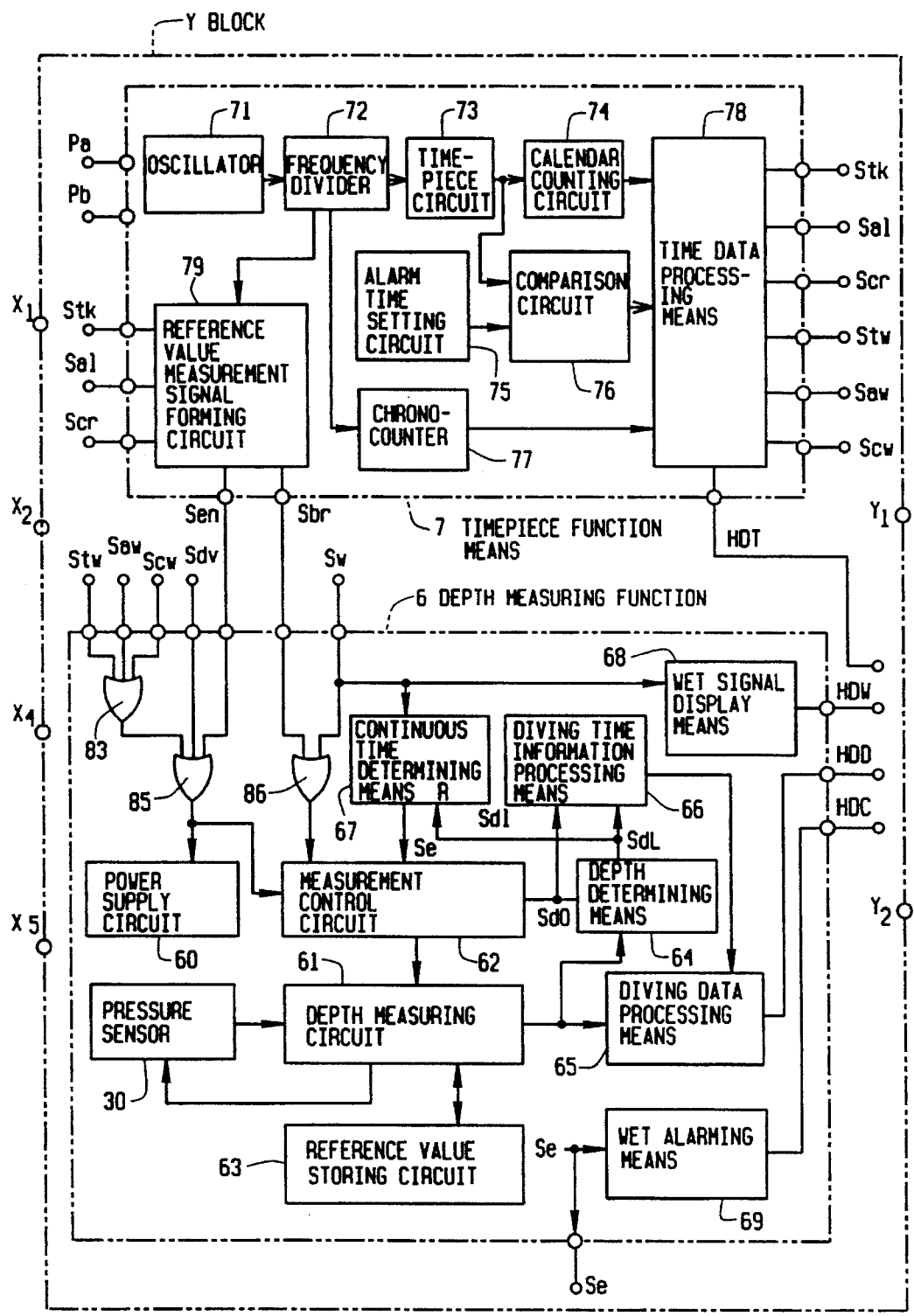
FIG. 3 is a detailed block diagram of a block Y including a timepiece function means and a depth measuring function means shown in FIG. 1.

FIG. 3 is a block diagram of the block Y in FIG. 1, which includes the timepiece function means 7 and the depth measuring function means 6.

Referring to FIG. 3, reference numeral 71 denotes an oscillator; 72, a frequency divider; 73, a timepiece circuit; and 74, a calendar counting circuit for supplying count values of a time and calendar, and a clock signal to the depth measuring function means 6 and the like. Reference numeral 75 denotes an alarm time setting circuit. Reference numeral 76 denotes a comparison circuit for comparing an output from the timepiece circuit 73 with an output from the alarm time setting circuit 75 to control the operation of the alarm function. A chronocounter 77 receives a clock signal from the frequency divider 72 to perform a stopwatch function. A time data processing means 78 receives outputs from the calendar counting circuit 74, the comparison circuit 76, and the chronocounter 77 and outputs display data HDT necessary for each mode to the display switching means 9 on the basis of the mode selection signal Stk, Sal, Scr, Stw, Saw, or Scw. Upon reception of the mode selection signals Stk, Sal, and Scr, i.e., in the timepiece mode, a reference value measurement signal forming circuit 79 outputs signals Sen and Sbr for intermittently operating the depth measuring function means 6 using a signal output from the frequency divider 72.

As described above, the timepiece function means 7 is constituted by the oscillator 71, the frequency divider 72, the timepiece circuit 73, the calendar counting circuit 74, the alarm time setting circuit 75, the comparison circuit 76, the chronocounter 77, the time data processing means 78, and the reference value measurement signal forming circuit 79. The pulse signals Pa and Pb output upon operations of the operating buttons Ba and Bb of the wristwatch 1 are supplied to the timepiece function means 7 and used to perform time correction, alarm setting, and the like as in the prior art.

The configuration of the depth measuring function means 6 will be described below.

Reference numeral 60 denotes a power supply circuit of the depth measuring function means 6. Reference numerals 83, 85, and 86 denote OR circuits. The mode selection signals Stw, Saw, Scw are input to the OR circuit 83. An output from the OR circuit 83, the depth measuring mode selection signal Sdv, and the signal Sen for intermittently operating the depth measuring function means 6 are input to the OR circuit 85. The output signal Sw from the water detecting means 5 and the signal Sbr for intermittently operating the depth measuring function means 6 are input to the OR circuit 86. The power supply circuit 60 starts to operate on the basis of the mode selection signals Stw, Saw, Scw, Sdv, and Sen, thereby supplying power to the depth measuring function means 6. In the timepiece mode, the power supply of the depth measuring function means 6 is turned off except when the reference value measurement signal forming circuit 79 outputs the output signal Sen to intermittently measure a reference pressure at a depth of 0 m, thereby preventing wasteful supply of a current.

Reference numeral 61 denotes a depth measuring circuit; and 62, a measurement control circuit. The measurement control circuit 62 is set in an operative state on the basis of the mode selection signals Stw, Saw, Scw, and Sdv and the signal Sen input to the OR circuit 83, as in the power supply circuit 60. The measurement control circuit 62 starts to operate in accordance with the output signal Sw from the water detecting means 5 and the output signal Sbr from the reference value measurement signal forming circuit 79, thereby controlling the operation of the depth measuring circuit 61. The depth measuring circuit 61 is constituted by an amplification circuit, an A/D conversion circuit, and the like, drives a pressure sensor 3, and measures a depth value.

A reference value storing circuit 63 stores a reference pressure at a depth of 0 m, which is measured by the depth measuring circuit 61. A depth is calculated using the 0-m depth reference value stored in the reference value storing circuit 63. Depth calculation is conventionally known well, and a detailed description thereof will be omitted.

Reference numeral 64 denotes a depth determining means; 65, a diving data processing means; and 66, a diving time information processing means. The depth determining means 64 outputs a depth signal Sd0 representing a depth state having a value smaller than a predetermined depth value to the measurement control circuit 62 and the diving time information processing means 66. At the same time, the depth determining circuit 64 outputs the depth signal Sd1 representing a depth state having a value larger than the predetermined depth value to the diving time information processing means 66 and a continuous time determining means 67. The diving time information processing means 66 performs time information processing related to diving, e.g., measurement of the diving time or measurement of the surface rest time, on the basis of the output signal Sd0 or Sd1 from the depth determining means 64, and outputs time information related to diving to the diving data processing means 65.

The diving data processing means 65 receives depth information measured by the depth measuring circuit 61 and time information related to diving, which is measured by the diving time information processing means 66, and outputs display data HDD necessary for the diving mode to the display switching circuit 9.

The continuous time determining circuit 67 receives the output signal Sw from the water detecting means 5 and the depth signal Sd1 representing a state with a larger depth value from the depth determining means 64, and counts a time for which the output signal Sw is at H level, and the depth signal Sd1 representing the state with the larger depth value is at L level. When the counted time reaches a predetermined period of time, the continuous time determining means 67 outputs the diving end signal Se and supplies the diving end signal Se to the measurement control circuit 62, a wet alarming means 69, and the mode selecting means 8. More specifically, the continuous time determining means 67 outputs the diving end signal Se when a state in which the water detecting means is wet, and the depth state represents a depth value smaller than a predetermined value continues for a predetermined period of time.

Figure 7:
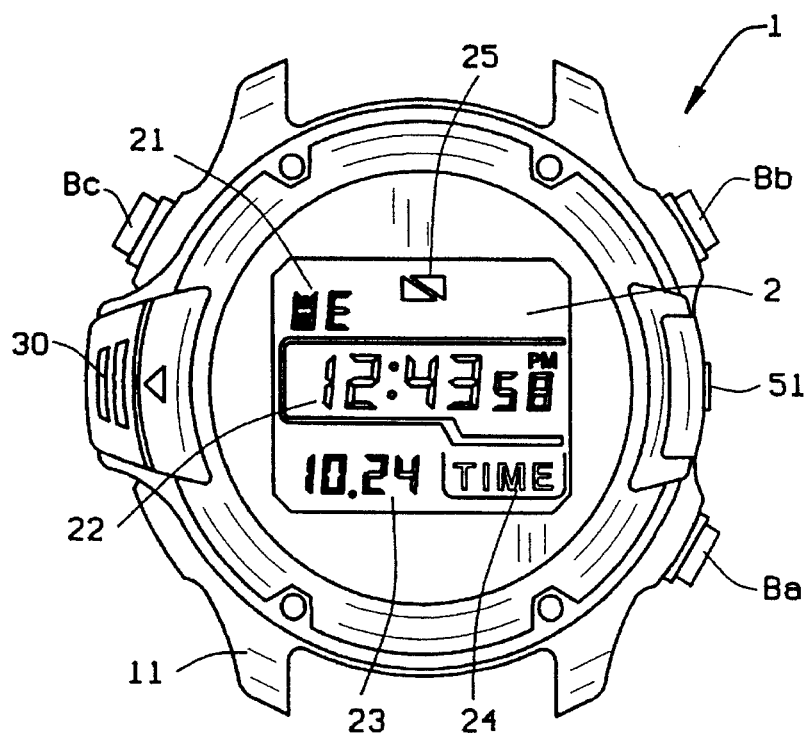
FIG. 7 is a view showing a display form in a state wherein the electronic wristwatch with the depth measuring function according to the present invention is wet with water.

A wet signal display means 68 receives the output signal Sw from the water detecting means 5. When the output signal Sw from the water detecting means 5 goes to H level, i.e., water is detected, the wet signal display means 68 outputs a signal HDW to a display switching circuit 90 (see FIG. 4) to turn on a wet mark 25 on the display means 2, as shown in FIG. 7.

Figure 10:
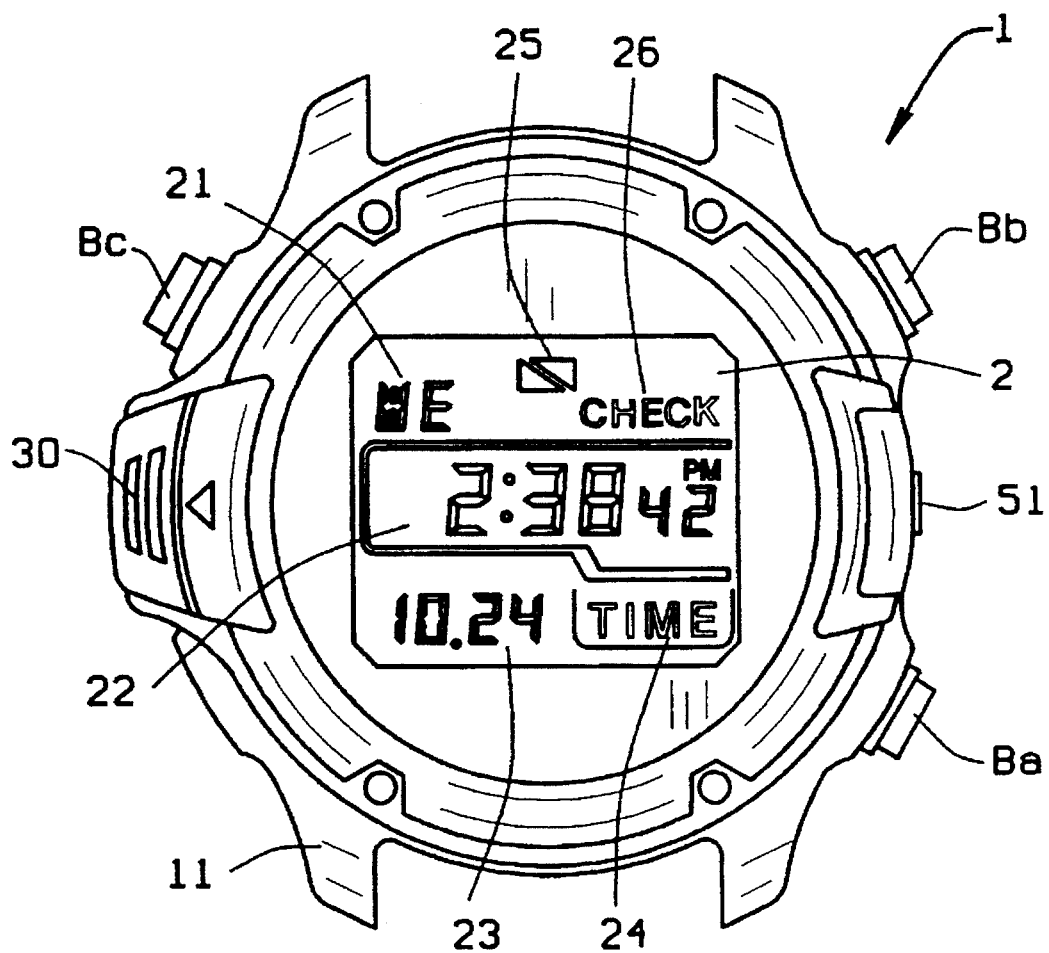
FIG. 10 is a view showing a wet alarm display form of the electronic wristwatch with the depth measuring function according to the present invention when the wristwatch is left wet for a long time after surfacing.

Upon reception of the diving end signal Se from the continuous time determining means 67, the wet alarm display means 69 outputs a signal HDC to the display switching circuit 9 (to be described later) shown in FIG. 4 to turn on a wet alarm mark 26 on the display means 2, as shown in FIG. 10.

Figure 4:
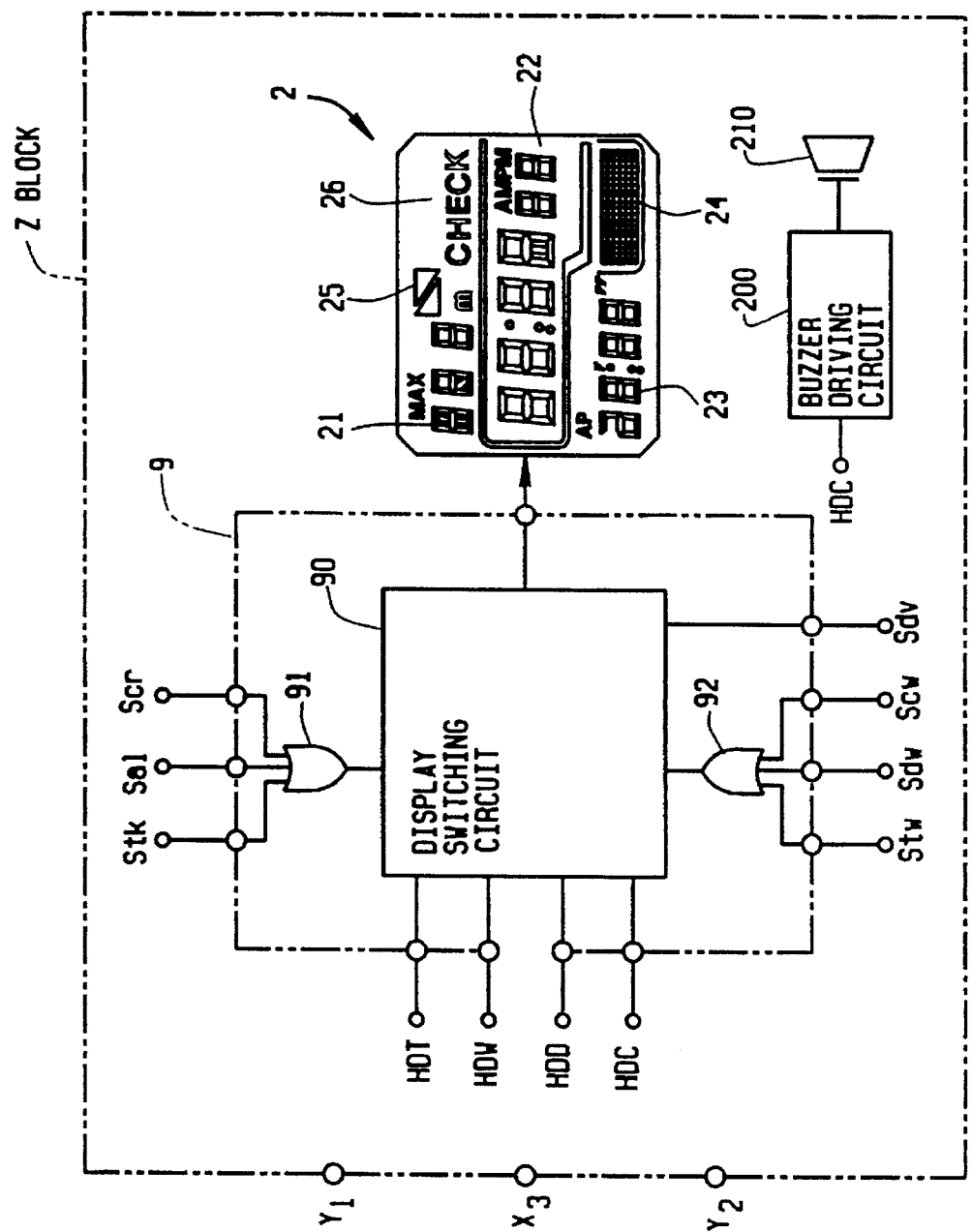
FIG. 4 is a detailed block diagram of a block Z including a display switching means and a display means shown in FIG. 1.

When the signal HDC is supplied to a buzzer driving circuit 200 shown in FIG. 4, a wet alarm tone can be generated from a buzzer 210.

As described above, the depth measuring function means 6 is constituted by the power supply circuit 60, the depth measuring circuit 61, the measurement control circuit 62, the reference value storing circuit 63, the depth determining circuit 64, the diving data processing means 65, the diving time information processing means 66, the continuous time determining means 67, the wet signal display means 68, the wet alarming means 69, and the OR circuits 83, 85, and 86.

FIG. 4 is a block diagram of the block Z in FIG. 1, which includes the display switching means 9 and the display means 2.

Referring to FIG. 4, reference numeral 90 denotes a display switching circuit; and 91 and 92, OR circuits. The mode selection signals Stk, Sal, and Scr from the first loop n are input to the OR circuit 91. The mode selection signals Stw, Saw, and Scw from the second loop w are input to the OR circuit 92. The display switching circuit 90 is controlled on the basis of an output signal from the OR circuit 91 or 92 and the mode selection signal Sdv, and display data necessary for each mode is output to the display means 2. Reference numeral 200 denotes the buzzer driving circuit; and 210, the buzzer. As described above, the display switching means 9 is constituted by the display switching circuit 90 and the OR circuits 91 and 92.

The operation of the electronic wristwatch 1 with the depth measuring function having the above configuration will be described in accordance with each mode.

Figure 8:
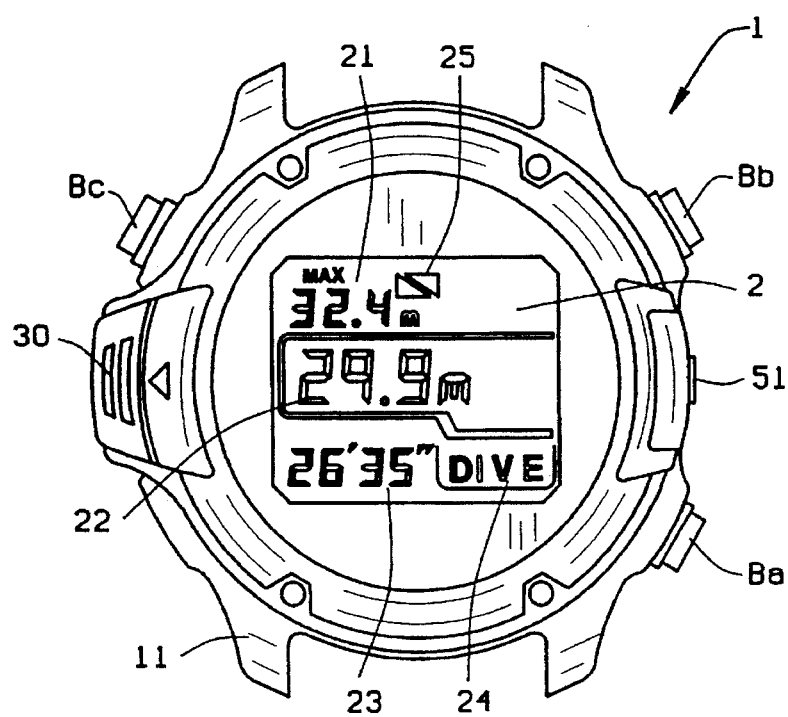
FIG. 8 is a view showing a depth display form in a depth measuring mode of the electronic wristwatch with the depth measuring function according to the present invention.
Figure 9:
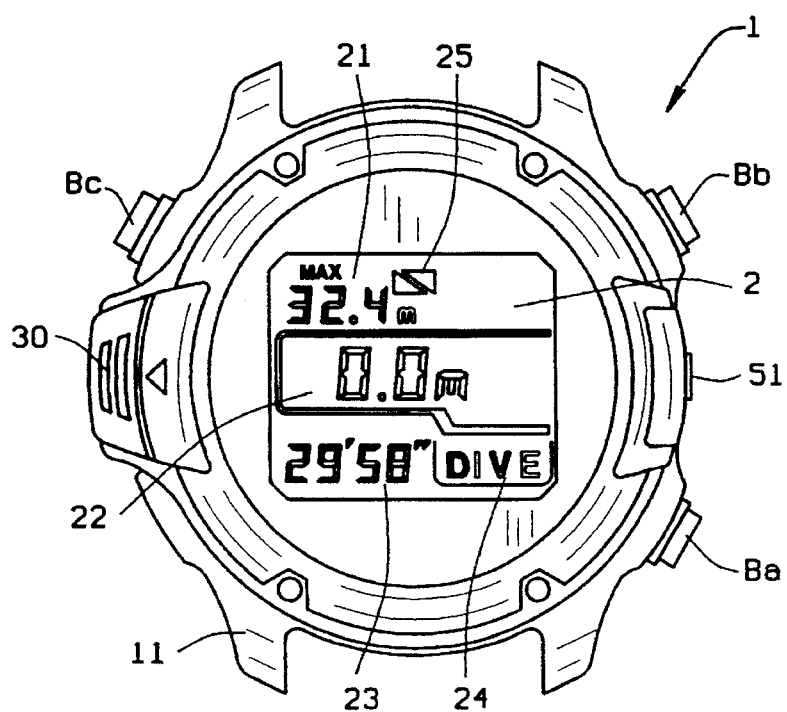
FIG. 9 is a view showing a display form of the electronic wristwatch with the depth measuring function according to the present invention in a surface state immediately after diving.

FIG. 6 shows a time display form in the timepiece mode of the electronic wristwatch 1 with the depth measuring function according to the present invention. FIG. 7 shows a display form in a state wherein the wristwatch is wet with water (a state wherein the wristwatch is wet immediately after diving or with rain). FIG. 8 shows a depth display form in the depth measuring mode. FIG. 9 shows a display form in a surface state after diving. FIG. 10 shows a wet alarm display form set when the wristwatch is left wet for a long time after surfacing.

(1) A normal timepiece mode without diving will be described.

The mode selecting means 8 shown in FIG. 2 is set in the state of the first loop n and circulatively outputs the mode selection signals Stk, Sal, and Scr in accordance with the pulse signal Pc generated upon operation of the operating button Bc. When these mode selection signals Stk, Sal, and Scr are input to the display switching means 9, the display switching means 9 selects the display data HDT from the timepiece function means 7 as long as the display switching circuit 90 is controlled in accordance with an output signal from the OR circuit 91.

More specifically, when the time mode selection signal Stk is output, time and calendar information is output to the display switching means 7 by the time data processing means 78. The time and calendar information is sent to the display means 2 by the display switching means 9. As shown in FIG. 6, a day of the week "WE", time "12:38:56 PM", date "10.24 " and time mode mark "TIME" are displayed at display portions 21, 22, 23, and 24 of the display means 2, respectively.

When the alarm mode selection signal Sal is output, time and alarm information is output to the display switching means 9 from the time data processing means 78. The time and alarm information is sent to the display means 2 by the display switching means 9.

Although not illustrated, a day of the week, time, alarm time, and alarm time mode mark (e.g., "ALM") are displayed at the display portions 21, 22, 23, and 24 of the display means 2, respectively.

When the chronograph mode selection signal Scr is output, part of time information and chronograph information are output to the display switching means 9 from the time data processing means 78. The part of the time information and the chronograph information are sent to the display means 2 by the display switching means 9. Although not illustrated, 1/100 second, hour/minute/second of the chronograph, hour/minute of the time information, and a chronograph mode mark (e.g., CRN) are displayed at the display portions 21, 22, 23, and 24 of the display means 2, respectively.

The intermittent sampling operation of a reference pressure value in the timepiece mode will be described below.

In the timepiece mode, when the signals Sen and Sbr are output from the reference value measurement signal forming circuit 79 of the timepiece function means 7 shown in FIG. 3 every predetermined period of time (e.g., one hour), the measurement control circuit 62 of the depth measuring function means 6 operates the depth measuring circuit 61 to cause the reference value storing circuit 63 to store a 0-m depth reference pressure value detected by the pressure sensor 30. On the basis of the current weather data, a change in atmospheric pressure per hour is normally 1 hPa or less, and about 3 hPa even when the change is very large. For this reason, when sampling is performed once in two hours, the error range of the pressure presents almost no problem, and required precision can be maintained. Since a change in reference pressure of 1 hPa corresponds to a depth of 1 cm in salt water, sampling of the atmospheric pressure is performed every hour, and the measured atmospheric pressure is stored in the reference value storing circuit 63 as a reference pressure value. In this case, normally, a measurement error corresponding to a depth of only 1 cm is generated. Even with a very large change in atmospheric pressure, a measurement error corresponding to a depth of only about 3 cm is generated. Therefore, in obtaining a currently commercially available electronic wristwatch with a depth measuring function, whose minimum measurement unit is 10 cm in depth level, the measurement precision is not influenced at all.

(2) A program operation at the start of diving will be described below.

① Depth Measurement Preparation Mode

When diving is started, and the outer case 11 of the electronic wristwatch 1 and the water detecting terminal 51 are rendered electrically conductive with water or salt water, the electrical resistance value therebetween becomes lower than the resistance value of the pull-down resistor 52 (see FIG. 2). For this reason, the input terminal of the water detecting circuit 54 is set at the voltage level VDD, i.e., H level. The output signal Sw from the water detecting circuit 54 goes to H level accordingly, and the forced designation terminal Ap of the mode selecting means 8 is set at H level. The state of the second loop w, i.e., the depth measurement preparation mode for forcibly operating the depth measuring function means 6 is set. In this mode, the depth measuring circuit 61 starts to operate and measure a depth on the basis of the 0-m depth reference pressure value which is intermittently sampled in the timepiece mode and stored in the reference value storing circuit 63. The depth determining means 64 starts to determine whether the depth state represents a value smaller or larger than a predetermined depth value. If the depth state represents a value smaller than the predetermined depth value, the depth signal Sd0 of H level representing a smaller depth value is output. Since the output signal Sw from the water detecting means 5 is simultaneously input to the wet signal display means 68, the signal HDW is output. As a result, in accordance with an output from the display switching circuit 90, the wet mark 25 is turned on at the display means 2, as shown in FIG. 7.

In this mode, the mode selection signals Stw, Saw, and Scw are circulatively output in accordance with the pulse signal Pc generated upon operation of the operating button Bc. For this reason, the display switching means 9 selects an information signal from the timepiece function means 7 as long as the display switching means 9 is controlled in accordance with an output signal from the OR circuit 92 which receives these mode selection signals.

The display form of the display means 2, which is set when the time mode selection signal Stw, the alarm mode selection signal Saw, and the chronograph mode selection signal Scw are output, is different from the display form of the display means 2, which is set when the time mode selection signal Stk, the alarm mode selection signal Sal, and the chronograph mode selection signal Scr are output, only in that the wet mark 25 is turned on at the display portion 21 in the time display state, as shown in FIG. 7.

② Depth Measuring Mode

After start of diving, as shown in FIG. 3, when it is detected that the depth signal Sd1 representing a larger depth value from the depth determining means 64 is at H level, i.e., the depth state represents a value larger than a predetermined value, the state of the second loop w, i.e., the depth measurement preparation mode shifts to the depth measuring mode for outputting the mode selection signal Sdv. In this state, time and depth information related to diving is output to the display switching means 9 from the diving data processing means 65. Additionally, the time and depth information HDD related to diving is sent to the display means 2 by the display switching means 9.

In this mode, as shown in FIG. 8, information necessary for diving, i.e., a maximum depth (e.g., 32.4 m), a current depth (e.g., 24.9 m), a diving time (e.g., 26'35"), a diving mode mark "DIVE", and the wet mark 25 are always displayed at the display portions 21, 22, 23, and 24 of the display means 2, respectively.

Upon completion of planned diving and starting to come to the surface, the depth determining means 64 detects a depth state representing a value smaller than a predetermine depth value, and the depth signal Sd0 representing a smaller depth value goes to H level. At this time, the current depth at the display portion 22 becomes "0.0 m", as shown in FIG. 9. Although the maximum depth "32.4 m" at the display portion 21 and the diving mode mark "DIVE" at the display portion 24 remain unchanged, the diving time at the display portion 23 becomes "29'58"". This state is maintained until the diving end signal Se representing that a predetermined period of time has elapsed after a depth state representing a value larger than a predetermined value is changed to a depth state representing a value smaller than the predetermined depth value is output from the continuous time determining means 67.

In this state, when the predetermined period of time has elapsed, and the continuous time determining means 67 outputs the diving end signal Se, the mode selecting means 8 shifts the mode from the depth measuring mode for outputting the mode selection signal Sdv to the state of the second loop w, i.e., the depth measurement preparation mode for circulatively outputting the mode selection signals Stw, Saw, and Scw. In this state, water or salt water is no longer present on the outer case 11 of the electronic wristwatch 1, the water detecting terminal 51 and the outer case 11 are electrically insulated from each other, and as a result, the input terminal of the water detecting circuit 54 is set at the voltage level VSS, i.e., L level by the pull-down resistor 52. At this time, the output signal Sw from the water detecting circuit 54 goes to L level, the forced designation terminal Ap of the mode selecting means 8 is set at L level, and the state of the first loop n, i.e., the timepiece mode for circulatively outputting the mode selection signals Stk, Sal, and Scr is set.

However, assume that when the mode selecting means 8 shifts the mode from the depth measuring mode to the depth measurement preparation mode in accordance with the diving end signal Se output from the continuous time determining means 67, the outer case 11 of the electronic wristwatch 1 and the water detecting terminal 51 are kept rendered electrically conductive with water or salt water. In this case, the input terminal of the water detecting circuit 54 is set at the voltage level VDD, i.e., H level, and the output signal Sw from the water detecting circuit 54 goes to H level. The timepiece mode is not set, and the state of the second loop w, i.e., the depth measurement preparation mode is maintained.

When the diving end signal Se is supplied to the wet alarming means 69, HDC is output. As shown in FIG. 10, the wet alarm mark 26 is turned on at the display portion 21 through the display switching circuit 90 shown in FIG. 4, thereby alarming the user. In addition, as shown in FIG. 4, an alarm tone is generated from the buzzer 210 in accordance with HDC to perform alarming. In this embodiment, turning on of the wet alarm mark and generation of the alarm tone are simultaneously performed. However, these operations may be independently performed. Alternatively, the wet alarm mark may be flickered without arranging another wet alarm.

The above operation is performed to advise the user to cancel the wet state of the water detecting means because, when the water detecting means is wet, the depth measuring function means 6 is operated to increase the current consumption as compared to the timepiece mode. Upon wiping water, the water detection signal Sw goes to L level, and the mode selecting means 8 restores the timepiece mode.

Figure 11:
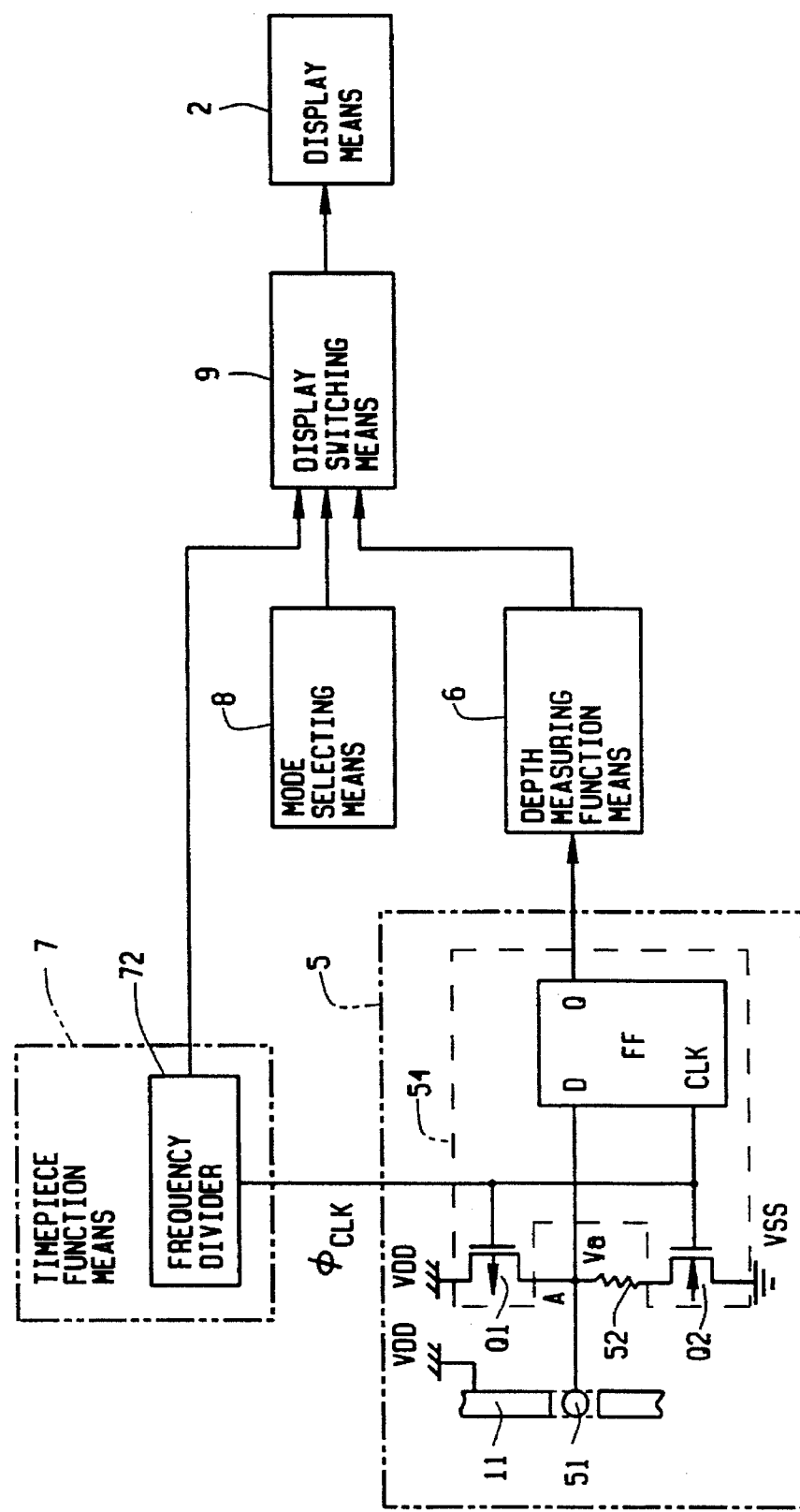
FIG. 11 is a block diagram showing the second embodiment of an electronic wristwatch with a depth measuring function according to the present invention.

FIG. 11 is a block diagram showing another embodiment of an electronic wristwatch with a depth measuring function according to the present invention, in which the power consumption of the water detecting means is saved by operating a water detecting means 5 at a predetermined time interval. Referring to FIG. 11, the same reference numerals as in FIGS. 1 and 3 denote the same constituent elements, and a detailed description thereof will be omitted.

Referring to FIG. 11, a sampling pulse $\Phi_{CLK}$ is output from a frequency divider 72 of a timepiece function means 7 at a predetermined period (e.g., one second). A water detecting circuit 54 of the water detecting means 5 includes a p-channel transistor Q1, an n-channel transistor Q2, and a D flip-flop FF.

Figure 12:
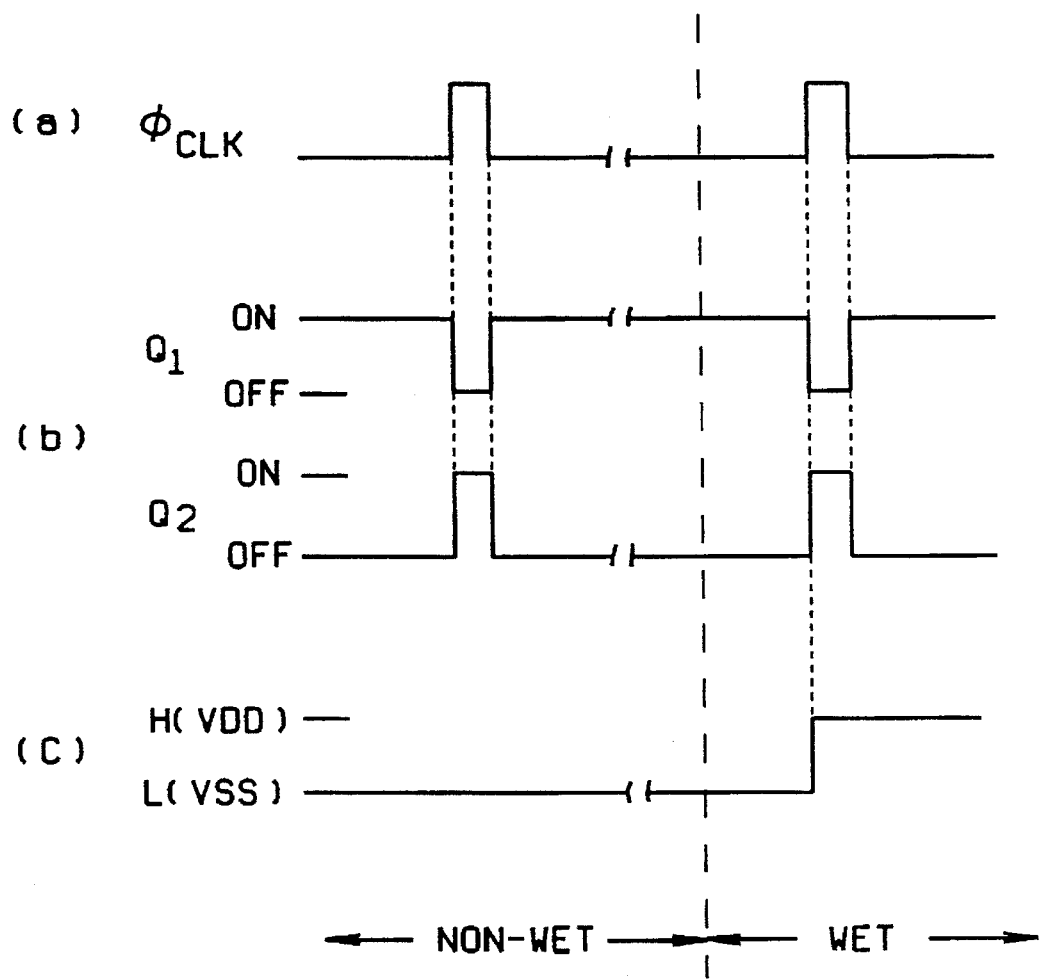
FIG. 12 is a timing chart for explaining the operation of a modification shown in FIG. 11.

When the frequency divider 72 of the timepiece function means 7 outputs a positive sampling pulse $\Phi_{CLK}$ as shown in FIG. 12 (a), the transistor Q1 in an ON state is set in an OFF state, as shown in FIG. 12 (b), and the transistor Q2 in an OFF state is set in an ON state.

When a water detecting terminal 51 and an outer case 11 of the wristwatch are not rendered conductive with water or salt water, the resistance value therebetween becomes higher than the resistance value of a pull-down resistor 52. For this reason, a potential Va at a connecting point A becomes VSS, and this potential is applied to a terminal D of the flip-flop FF. On the other hand, since the sampling pulse $\Phi_{CLK}$ from the frequency divider 72 is also supplied to a clock terminal CLK of the flip-flop FF, a signal Sw of H level as shown in a non-wet state of FIG. 12 (c) is output from its terminal Q.

When the water detecting terminal 51 and the outer case 11 of the wristwatch are rendered conductive with water or salt water, the resistance value therebetween becomes lower than the resistance value of the pull-down 52, the potential Va at the connecting point A becomes VDD, and this potential is applied to the terminal D of the flip-flop FF. As a result, at the sampling timing, the signal Sw of H level as shown in a wet state of FIG. 12 (c) is output from the terminal Q.

Figure 13:
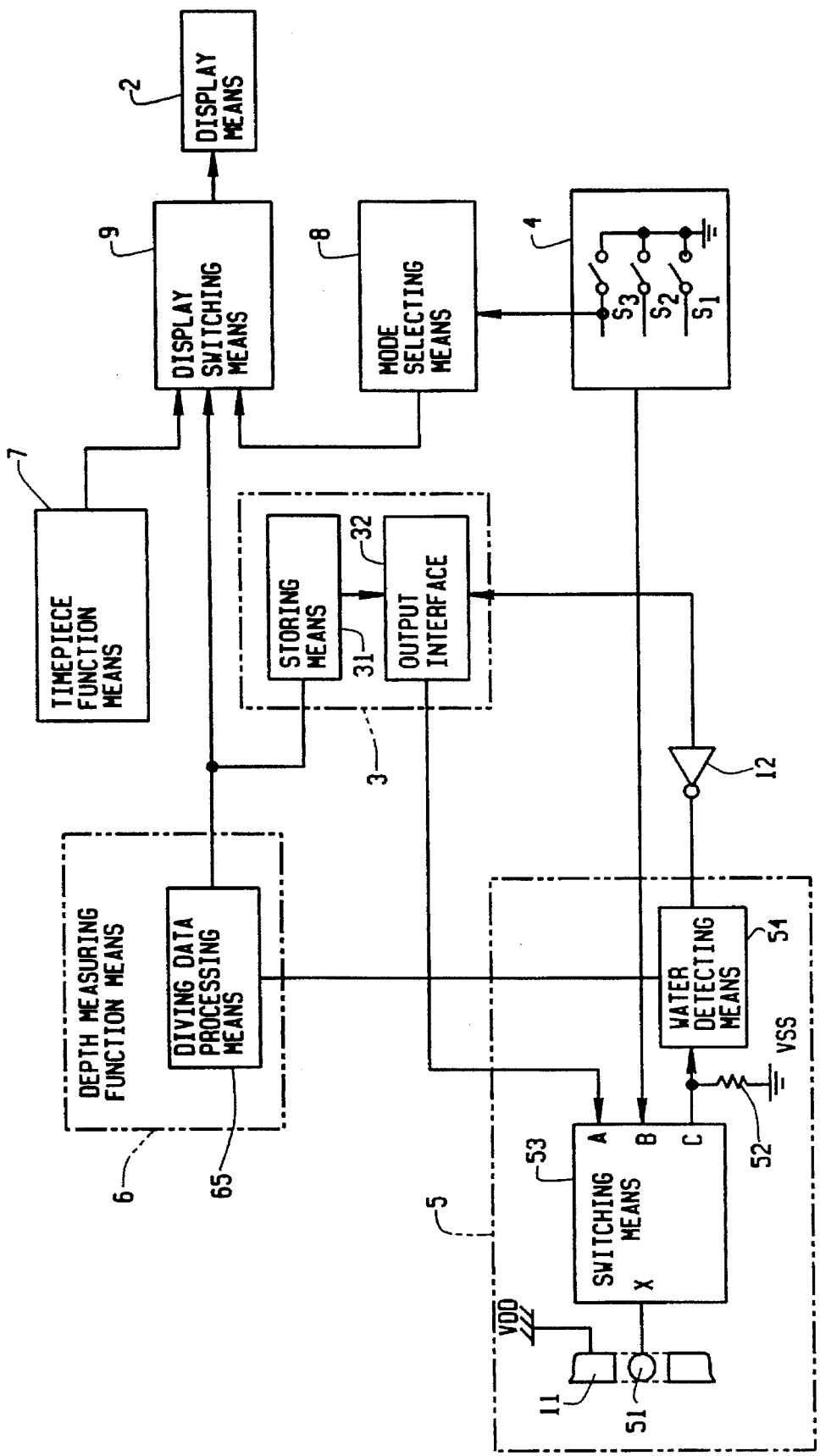
FIG. 13 is a block diagram of the third embodiment of an electronic wristwatch with a depth measuring function according to the present invention.

FIG. 13 shows still another embodiment of an electronic wristwatch with a depth measuring function according to the present invention.

This embodiment is effectively adopted to store diving data obtained during diving in a storing means in the wristwatch, and to thereafter output this data to an external equipment for recording or analysis.

Referring to FIG. 13, the configurations and operations of a display means 2, a switch input means 4, a depth measuring function means 6, a timepiece function means 7, a mode selecting means 8, and a display switching means 9 are the same as those in the first embodiment of the present invention shown in FIGS. 2 to 4, and a detailed description thereof will be omitted. Only points different from the first embodiment will be described below.

A data storing/transfer means 3 is additionally arranged and constituted by a storing means 31 for storing diving data from a diving data processing means 65, and an output interface 32 for transferring the diving data stored in the storing means 31 to an external equipment in accordance with a data transfer signal from the switch input means 4. The data transfer signal is a signal of H level, which is output from the switch input means 4 by simultaneously depressing operating buttons Ba and Bb of the switch input means 4.

A switching means 53 for switching between water detection and data transfer is provided to a water detecting means 5. A terminal X of the switching means 53 is connected to a water detecting terminal 51, which is partially exposed outside an outer case 11 of the wristwatch and is electrically insulated from the outer case 11. The switching means 53 connects the terminal X and a terminal A with each other when a terminal C is set at H level, and connects the terminal X and a terminal B with each other when the terminal C is set at L level. In this embodiment, the water detecting terminal 51 also serves as an external terminal for data transfer. An inverter 12 is connected to the input side of a water detecting circuit 54.

The operation will be described below.

A timepiece function, a depth measuring function, and display of time data and diving data in this embodiment are the same as those in the above-described first embodiment, and a detailed description thereof will be omitted. A characteristic function of this embodiment, i.e., switching between diving data transfer and water detection will be described below.

In a normal timepiece mode or depth measuring mode, unless the operating buttons Ba and Bb are simultaneously depressed, a signal of L level is output from the switch input means 4. This output signal of L level is input to the output interface 32 of the data storing/transfer means 3 and the switching means 53. Therefore, the output interface 32 does not perform a data transfer operation, and the terminal X of the switching means 53 is connected to the terminal B.

On the other hand, a signal of L level from the switch input means 4 is inverted to H level by the inverter 12 and input to the water detecting circuit 54, so the water detecting circuit 54 performs a water detecting operation. More specifically, when the water detecting terminal 51 and the outer case 11 of the wristwatch are rendered conductive with water, the water detecting circuit 54 outputs VDD as the potential of the outer case 11 through the terminal B of the switching means 53. When the water detecting terminal 51 and the outer case 11 are not rendered conductive, the water detecting circuit 54 outputs VSS through a pull-down resistor 52.

To the contrary, when diving data is to be transferred to an external equipment after diving, the operating buttons Ba and Bb are simultaneously depressed. With this operation, a signal of H level, i.e., a data transfer signal is output from the switch input means 4. As a result, the output interface 32 of the data storing/transfer means 3 operates to output the diving data stored in the storing means 31, and the terminal X of the switching means 53 is connected to the terminal A. For this reason, the diving data output from the output interface 32 is transferred to the external equipment from the water detecting terminal 51 serving as an external terminal for data transfer through the switching means 53. At this time, since a signal of L level inverted by the inverter 12 is input to the water detecting circuit 54, the water detecting operation is not performed.

Figure 14:
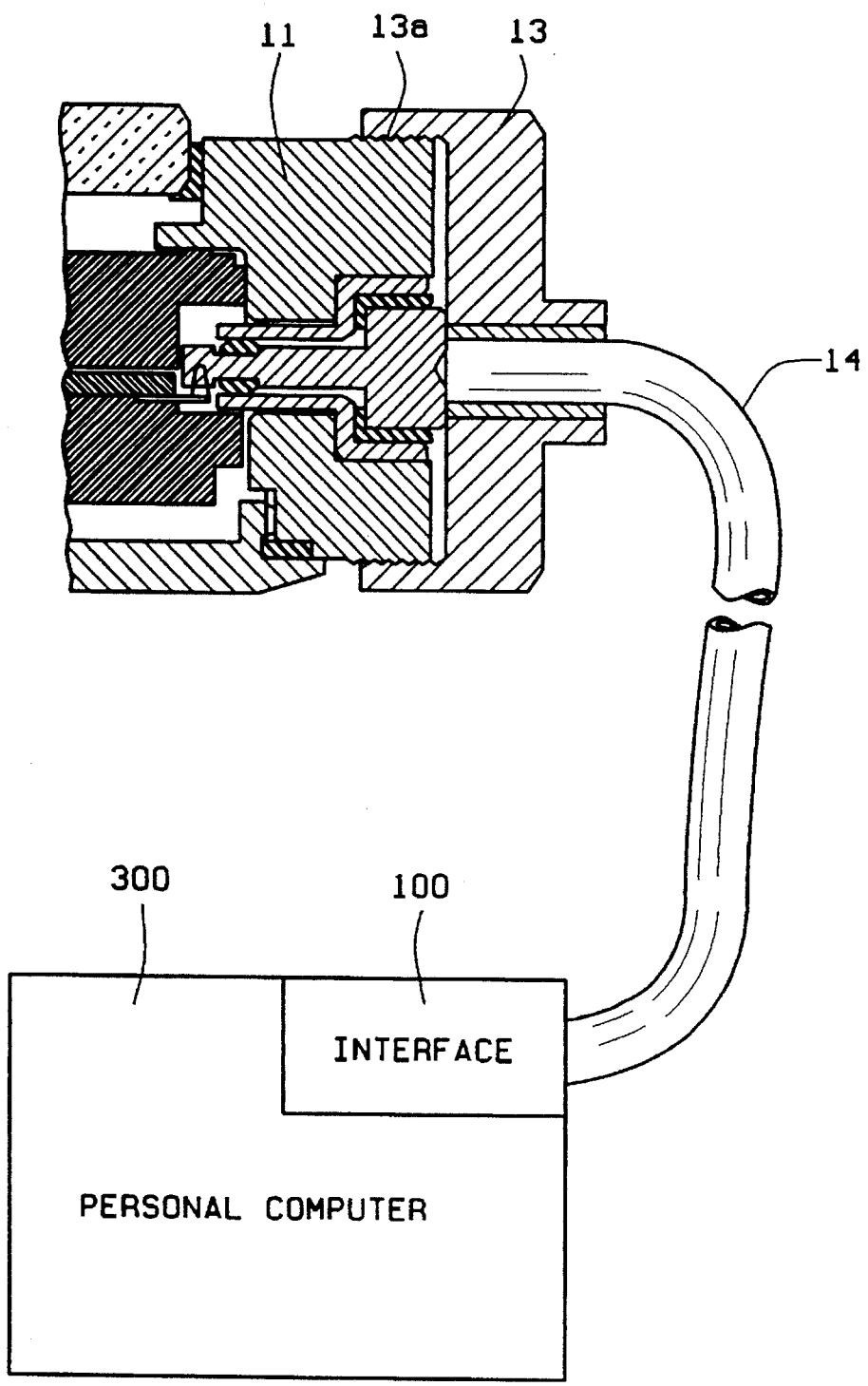
FIG. 14 is a view showing a connection state for data transfer to an external equipment in the embodiment shown in FIG. 13.

To transfer the diving data stored in the storing means 31 of the electronic wristwatch to an external equipment such as a personal computer, as shown in FIG. 14, a connector 13 attached to one end of a cable 14 is connected to the outer case 11 of the wristwatch by, e.g., a screw portion 13a. The other end is connected to a personal computer 300 as an external equipment through an interface 100.

As described above, by simultaneously depressing the operating buttons Ba and Bb, the terminal X and the terminal A of the switching means 53 are connected with each other, and the diving data stored in the storing means 31 of the data storing/transfer means 3 is transferred to the personal computer 300 through the interface 100.

According to the third embodiment, one terminal is commonly used as the external terminal for transferring the diving data to the external equipment and the water detecting terminal for performing water detection. For this reason, a competitive product with a low unit price can be manufactured without any limit on design.

In the above-described three embodiments, the electronic wristwatch has been exemplified as the electronic equipment with the depth measuring function. However, the present invention need not take the form of the electronic wristwatch and may be realized as an electronic equipment combined with another function, as a matter of course.

In the above embodiments, the electronic wristwatch having the display means 2 for digital display has been exemplified. However, the present invention can obviously be applied to a hand-display-type electronic wristwatch. The wet alarm mark 26 may be printed, and a hand may be driven to the position of the wet alarm mark 26 for alarming.

In addition, when the wet alarm mark 26 is canceled by operating one of the operating buttons Ba, Bb, and Bc after water, salt, dust, or dirt around the water detecting terminal 51 of the water detecting means 5 is wiped out, an unnecessary operation of the depth measuring function means 6 due to repeat of wet and dry states can be prevented, thereby further suppressing the current consumption.

Furthermore, in this embodiment, the wet mark 25 and the wet alarm mark 26 are arranged independently of the mode mark display portion 24. However, the mode mark display portion 24 may be commonly used for the wet mark 25 and the wet alarm mark 26, as a matter of course.

As has been described above, according to the present invention, the depth measuring function means is forcibly operated without operating a main switch or power supply switch only when water or salt water is detected by the water detecting means. For this reason, an operation failure of the depth measuring function due to forgetting of switching on of the main switch or the power supply switch is prevented. Therefore, an electronic equipment with a depth measuring function can be provided in which depth measurement can be properly performed by all divers from beginners to experienced divers with high reliability.

In addition, according to the present invention, when a depth state representing a value smaller than a predetermined depth value continues for a predetermined period of time, a wet alarm is displayed. For this reason, upon completion of diving, even if water or salt water remains on the water detecting means, or salt, dust, or dirt attaches to the water detecting means, the depth measuring circuit does not operate, thereby preventing unexpected run down of the battery. Hence, an electronic equipment with a depth measuring function, with which the service life of a battery is long, can be provided. Additionally, since wet alarming is performed for the user of the electronic equipment with the depth measuring function, salt, dust, or dirt around the water detecting means can be actively removed. Therefore, an electronic equipment with a depth measuring function can be provided in which a reliable state of the water detecting means is always maintained.

Furthermore, according to the present invention, as for measurement and storing of the 0-m reference value, in the timepiece mode, the depth measuring circuit is intermittently operated every predetermined period of time, e.g., one hour, and the detected reference pressure value is stored in the reference value storing circuit in advance. Therefore, an electronic equipment with a depth measuring function can be provided in which the depth measurement precision does not depend on the timing of the 0-m reference measurement regardless of the starting timing of diving, thereby performing error-free depth measurement with any diving style at the start of diving.

INDUSTRIAL APPLICABILITY

An electronic equipment with a depth measuring function according to the present invention is effectively realized as an electronic wristwatch or an electronic equipment with another function and used for diving as one of representative marine sports.

We claim:

1. An electronic equipment with a depth measuring function comprising depth measuring function means, at least timepiece function means, display means for switching and displaying values obtained from said depth measuring function means and said timepiece function means, water detecting means for detecting water, and mode selecting means for shifting between a timepiece mode, a depth measurement preparation mode, and a depth measurement mode, whereupon detection of water by said water detecting means, said mode selecting means shifts from said timepiece mode to said depth measurement preparation mode during which said display means displays the value obtained from said timepiece function means and said depth measuring function means is operative, and whereupon detection of a depth larger than a predetermined depth value by said depth measuring function means, said mode selecting means shifts from said depth measurement preparation mode to said depth measurement mode.

2. An electronic equipment with a depth measuring function according to claim 1, wherein said depth measuring function means includes continuous time determining means for determining when diving at a depth smaller than said predetermined depth value has continued for a predetermined period of time during said depth measurement mode, whereupon said continuous time determining means outputs a diving end signal and said mode selecting means shifts from said depth measurement mode to said depth measurement preparation mode.

3. An electronic equipment with a depth measuring function according to claim 2, wherein said mode selecting means shifts from said depth measurement preparation mode to said timepiece mode when said water detecting means does not detect water.

4. An electronic equipment with a depth measuring function according to claim 2, wherein said depth measuring function means further comprises wet alarming means, and said display means displays a wet alarm signal when said continuous time determining means outputs said diving end signal.

5. An electronic equipment with a depth measuring function according claim 4, wherein said wet alarming means is a wet alarm display means.

6. An electronic equipment with a depth measuring function according to claim 4, wherein said wet alarming means includes a buzzer.

7. An electronic equipment with a depth measuring function according to claim 1, wherein said water detecting means includes a water detecting terminal exposed to an external portion of said equipment.

8. An electronic equipment with a depth measuring function according to claim 7, wherein said equipment includes an outer case comprising a metal, and said water detecting terminal is provided on said outer case through an insulating member.

9. An electronic equipment with a depth measuring function according to claim 7, wherein said water detecting terminal intermittently performs water detection in accordance with a sampling pulse.

10. An electronic equipment with a depth measuring function according to claim 9, wherein said water detecting terminal and said outer case are held at a same potential during a non-sampling period.

11. An electronic equipment with a depth measuring function according to claim 8, wherein said water detecting terminal intermittently performs water detection in accordance with a sampling pulse.

12. An electronic equipment with a depth measuring function according to claim 11, wherein said water detecting terminal and said outer case are held at a same potential during a non-sampling period.

13. An electronic equipment with a depth measuring function according to claim 1, wherein said depth measuring function means comprises a depth measuring circuit for measuring a depth, a reference value storing circuit for storing a reference pressure value, and a measurement control circuit for intermittently operating said depth measuring circuit, said measurement control circuit intermittently operating said depth measuring circuit during said timepiece mode to store a reference pressure value in said reference value storing circuit.

14. An electronic equipment with a depth measuring function according to claim 13, wherein said depth measuring function means comprises a pressure sensor and a reference value measurement signal forming circuit for generating a reference value measurement signal for determining a reference pressure sampling timing, and said depth measuring circuit stores in said reference value storing circuit a pressure value detected from said pressure sensor in accordance with said reference value measurement signal.

15. An electronic equipment with a depth measuring function according to claim 14, wherein one interval of said reference pressure sampling timing is less than two hours.

16. An electronic equipment with a depth measuring function according to claim 7, further comprising diving data storing means for storing diving data from said depth measuring function means, and transfer means for externally transferring diving data from said diving data storing means.

17. An electronic equipment with a depth measuring function according to claim 16, wherein said transfer means comprises an output interface connected to said diving data storing means through a data output terminal disposed on an outer surface of said equipment.

18. An electronic equipment with a depth measuring function according to claim 17, wherein said data output terminal includes said water detecting terminal.

19. An electronic equipment with a depth measuring function according to claim 18, wherein said water detecting means comprises said water detecting terminal, a water detecting circuit, and switching means for selectively connecting said water detecting terminal to one of said water detecting circuit and said output interface.

* * * * *